(12) United States Patent
Kim et al.

(10) Patent No.: US 8,687,740 B2
(45) Date of Patent: Apr. 1, 2014

(54) RECEIVER AND RECEPTION METHOD FOR LAYERED MODULATION

(75) Inventors: Seong Rag Kim, Daejeon (KR); Seuck Ho Won, Daegeon (KR); Jung-Im Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 136 days.

(21) Appl. No.: 13/025,642

(22) Filed: Feb. 11, 2011

(65) Prior Publication Data

US 2011/0194653 A1    Aug. 11, 2011

(30) Foreign Application Priority Data

| Feb. 11, 2010 | (KR) | 10-2010-0012700 |
| Mar. 29, 2010 | (KR) | 10-2010-0027928 |
| Mar. 29, 2010 | (KR) | 10-2010-0027929 |
| Mar. 29, 2010 | (KR) | 10-2010-0027931 |
| Feb. 10, 2011 | (KR) | 10-2011-0011882 |

(51) Int. Cl.
    *H04L 27/06*    (2006.01)

(52) U.S. Cl.
    USPC ........... 375/340; 375/316; 375/341; 375/262; 375/343; 714/786; 370/320; 370/335; 370/342; 370/441; 370/479; 708/300; 708/422

(58) Field of Classification Search
    None
    See application file for complete search history.

(56) References Cited

U.S. PATENT DOCUMENTS

| 5,392,299 | A | * | 2/1995 | Rhines et al. | 714/756 |
| 5,732,093 | A | * | 3/1998 | Huang | 714/765 |
| 6,275,531 | B1 | * | 8/2001 | Li | 375/240.12 |
| 7,079,607 | B2 | | 7/2006 | Brunel | |
| 7,272,162 | B2 | | 9/2007 | Sano et al. | |
| RE41,001 | E | | 11/2009 | Oshima et al. | |
| 7,630,451 | B2 | | 12/2009 | Collins et al. | |
| 8,102,921 | B2 | | 1/2012 | Suh et al. | |
| 8,248,910 | B2 | | 8/2012 | Jokela et al. | |
| 8,432,980 | B2 | | 4/2013 | Yang et al. | |
| 2002/0118742 | A1 | * | 8/2002 | Puri et al. | 375/240.1 |
| 2002/0181604 | A1 | * | 12/2002 | Chen | 375/279 |
| 2004/0136469 | A1 | * | 7/2004 | Wang et al. | 375/295 |
| 2005/0259729 | A1 | * | 11/2005 | Sun | 375/240.1 |

(Continued)

OTHER PUBLICATIONS

U.S. Patent Office Action mailed May 13, 2013 in co-pending U.S. Appl. No. 13/025,742.

(Continued)

*Primary Examiner* — Shuwang Liu
*Assistant Examiner* — Gina McKie
(74) *Attorney, Agent, or Firm* — Staas & Halsey LLP

(57) ABSTRACT

A receiver for receiving a layer-modulated signal includes: a base layer decoding unit configured to calculate a bit metric including code bit information of a base layer based on the reception signal and decode an information bit of the base layer; and at least one enhancement layer decoding unit configured to decode an information bit of an upper layer of a lower layer based on the decoding results of the lower layer, wherein the base layer decoding unit and the at least one enhancement layer decoding unit are sequentially connected according to the order of the corresponding layers.

16 Claims, 5 Drawing Sheets

(56) References Cited

U.S. PATENT DOCUMENTS

| | | | |
|---|---|---|---|
| 2005/0265616 A1* | 12/2005 | Rose | 382/240 |
| 2006/0062314 A1 | 3/2006 | Palin et al. | |
| 2006/0153315 A1* | 7/2006 | Chen et al. | 375/295 |
| 2007/0025283 A1 | 2/2007 | Koslov | |
| 2007/0098162 A1* | 5/2007 | Shin | 380/201 |
| 2007/0141991 A1 | 6/2007 | Hong et al. | |
| 2007/0195878 A1 | 8/2007 | Bruls et al. | |
| 2007/0229344 A1* | 10/2007 | Meyer et al. | 341/161 |
| 2007/0245204 A1 | 10/2007 | Yomo et al. | |
| 2008/0095235 A1* | 4/2008 | Hsiang | 375/240.13 |
| 2008/0170636 A1 | 7/2008 | Han | |
| 2008/0225964 A1 | 9/2008 | Han et al. | |
| 2009/0022237 A1 | 1/2009 | Wang et al. | |
| 2009/0238286 A1 | 9/2009 | Kim et al. | |
| 2010/0046675 A1 | 2/2010 | Collins et al. | |
| 2010/0146141 A1 | 6/2010 | Lim et al. | |
| 2010/0157940 A1 | 6/2010 | Shitara | |
| 2011/0013718 A1 | 1/2011 | Ko et al. | |
| 2011/0286535 A1 | 11/2011 | Ko et al. | |
| 2011/0305300 A1 | 12/2011 | Ko | |
| 2012/0243561 A1 | 9/2012 | Loghin et al. | |
| 2012/0243618 A1 | 9/2012 | Suh et al. | |
| 2013/0010680 A1 | 1/2013 | Senarath et al. | |

OTHER PUBLICATIONS

U.S. Patent Office Action mailed Apr. 11, 2013 in co-pending U.S. Appl. No. 13/025,756.

U.S. Patent Office Action mailed Feb. 15, 2013 in co-pending U.S. Appl. No. 13/024,867.

U.S. Patent Office Action mailed Feb. 1, 2013 in co-pending U.S. Appl. No. 13/025,742.

U.S. Appl. No. 13/025,756, filed Feb. 11, 2011, Seong Rag Kim et al., Electronics and Telecommunications Research Institute.

U.S. Appl. No. 13/024,867, filed Feb. 10, 2011, Seong Rag Kim et al., Electronics and Telecommunications Research Institute.

U.S. Appl. No. 13,025,742, filed Feb. 11, 2011, Seong Rag Kim et al., Electronics and Telecommunications Research Institute.

U.S. Office Action mailed Oct. 10, 2013 in corresponding U.S. Appl. No. 13/024,867.

U.S. Office Action mailed Aug. 26, 2013 in corresponding U.S. Appl. No. 13/025,742.

U.S. Office Action mailed Oct. 4, 2013 in corresponding U.S. Appl. No. 13/025,756.

ETSI EN 300 744 v1.6.1 (Jan. 2009), "Digital Video Broadcasting (DVB); Framing Structure, Channel Coding and Modulation for Digital Terrestrial Television".

* cited by examiner

RECEIVER AND RECEPTION METHOD FOR LAYERED MODULATION

CROSS-REFERENCE TO RELATED APPLICATION

This application claims priority to and the benefit of Korean Patent Application No. 10-2010-0012700, 10-2010-0027931, 10-2010-0027929, 10-2010-0027928 and 10-2011-0011882 filed in the Korean Intellectual Property Office on Feb. 11, 2010, Mar. 29, 2010, Mar. 29, 2010, Mar. 29, 2010 and Feb. 10, 2011, the entire contents of which are incorporated herein by reference.

BACKGROUND OF THE INVENTION (a) Field of the Invention

The present invention relates to a receiver and a reception method.

(b) Description of the Related Art

A broadcasting system, providing diverse video qualities, transmits scalable video coded image information so as to be compatible with reception apparatuses having various performances. A scalable video coding (SVC) is classifying information into a plurality of layers according to the significance of image information and transmitting the same. When a transmitter performs layered transmission to effectively transmit image information using the SVC technique, a receiver reproduces the layers according to desired image quality or device performance.

A layer modulation technique, a typical technique among layered transmission techniques, modulates video information by layer and transmits the same. When a transmitter layer-modulates a base layer and an enhancement layer and transmits the same, a receiver receives the layer-modulated information, cancels interference of a lower layer by using an output from a demodulator, and acquires information regarding each layer. In this case, because the receiver uses the output from the demodulator, inter-layer interference is generated. Also, even when the receiver cancels interference by using an output from a decoder, signal regeneration is required, increasing the complexity of the receiver.

SUMMARY OF THE INVENTION

The present invention has been made in an effort to provide a receiver and a reception method for sequentially decoding information of upper layers based on decoded information of a lower layer.

An exemplary embodiment of the present invention provides a receiver for receiving a layer-modulated signal, including: a base layer decoding unit configured to calculate a bit metric including code bit information of a base layer based on the reception signal and decode an information bit of the base layer; and at least one enhancement layer decoding unit configured to decode an information bit of an upper layer of a lower layer based on the decoding results of the lower layer, wherein the base layer decoding unit and the at least one enhancement layer decoding unit are sequentially connected according to the order of the corresponding layers.

The base layer decoding unit may include: a deinterleaving unit configured to deinterleave the reception signal to generate a deinterleaved signal; a bit metric calculation unit configured to calculate a bit metric of the base layer including the code bit information of the base layer based on the deinterleaved signal; a branch metric calculation unit configured to calculate a branch metric of the base layer based on the bit metric of the base layer; and a decoding unit configured to decode the information bit of the base layer based on the branch metric of the base layer.

The enhancement layer decoding unit may receive a signal obtained by eliminating information of the lower layer based on the decoding results of the layer from the reception signal and decode the information bit of the upper layer.

The enhancement layer decoding unit may shift the signal without the information of the lower layer to a coding point in time of the upper layer and decode the information bit of the upper layer.

The enhancement layer decoding unit may shift the signal without the information of the lower layer to a point in time at which the lower layer was deinterleaved by interleaving, and shift the interleaved signal to the decoding point in time of the upper layer by deinterleaving.

The enhancement layer decoding unit may include: an enhancement layer deinterleaving unit configured to shift the signal without the information of the lower layer to the coding point in time of the upper layer; a bit metric calculation unit configured to calculate the bit metric of the upper layer including the code bit information based on an output signal from the enhancement layer deinterleaving unit; a branch metric calculation unit configured to calculate a branch metric of the upper layer based on the bit metric of the upper layer; and a decoding unit configured to decode the information bit of the upper layer based on the branch metric of the upper layer.

The enhancement layer decoding unit may decode the information bit of the upper layer based on temporary decoded information determined before the decoding of the lower layer is finished.

Another embodiment of the present invention provides a receiver for receiving a plurality of layer-modulated layer information, including: a reception unit configured to receive a first signal including the plurality of layer information; a first deinterleaving unit configured to deinterleave the first signal; a first decoding unit configured to calculate a bit metric of a first layer among the plurality of layers based on an output signal from the first deinterleaving unit to decode an information bit of the first layer; a second deinterleaving unit configured to shift a second signal delivered from the first decoding unit to a decoding point in time of the second layer as an upper layer of the first layer; and a second decoding unit configured to calculate a bit metric of the second layer based on an output signal from the second deinterleaving unit to decode an information bit of the second layer, and deliver a third signal obtained by eliminating information of the second layer from the second signal to a third layer as an upper layer of the second layer.

The first decoding unit may include: a bit metric calculation unit configured to calculate the bit metric of the first layer including code bit information of the first layer based on the output signal from the first deinterleaving unit; a branch metric calculation unit configured to calculate the branch metric of the first layer based on the bit metric of the first layer; and a decoding unit configured to decode the information bit of the first layer based on the branch metric of the first layer and generate the second signal including the upper layer information of the first layer based on the decoded information.

The second deinterleaving unit may shift the second signal obtained by removing the information of the first layer from the first signal by using the decoded information of the first decoding unit to a decoding point in time of the second layer.

The second deinterleaving unit may perform interleaving to shift the second signal to a point in time before the first layer was deinterleaved, and perform deinterleaving to shift from the shifted point in time to the coding point in time of the second layer.

The second decoding unit may include: a bit metric calculation unit configured to calculate a bit metric of the second layer including code bit information of the second layer based on an output signal from the second deinterleaving unit; a branch metric calculation unit configured to calculate a branch metric of the second layer based on the bit metric of the second layer; and a decoding unit configured to decode the information bit of the second layer based on the branch metric of the second layer and generate the third signal including information of an upper layer of the second layer based on the decoded information.

The first decoding unit or the second decoding unit may generate the second signal or the third signal based on temporary decoded information determined before decoding is finished.

Yet another embodiment of the present invention provides a reception method for receiving a plurality of layer-modulated layer information, including: receiving a first signal including the plurality of layer information; deinterleaving the first signal to generate a first deinterleaved signal; calculating a bit metric of a first layer, among the plurality of layers, based on the first deinterleaved signal to obtain decoded information of the first layer; generating a second signal including information of an upper layer of the first layer based on the decoded information of the first layer; shifting the second signal to a coding point in time of the second layer as the upper layer of the first layer to generate a second deinterleaved signal; calculating a bit metric of the second layer based on the second deinterleaved signal to obtain decoded information of the second layer; and generating a third signal including information of an upper layer of the second layer based on the decoded information of the second layer.

In generating the second signal, the second signal may be generated by eliminating the decoded information of the first layer from the first signal.

In generating the second signal, the second signal may be generated based on temporary decoded information determined before the decoding of the first layer is finished.

The obtaining of the decoded information of the first layer may include: calculating the bit metric of the first layer including code bit information of the first layer based on the first deinterleaved signal; calculating a branch metric of the first layer based on the bit metric of the first layer; and decoding information bit of the first layer based on the branch metric of the first layer.

In generating the second deinterleaved signal, interleaving may be performed to shift the second signal to a point in time before the first layer was deinterleaved, and deinterleaving may be performed to shift from the shifted point to the decoding point in time of the second layer to generate the second deinterleaved signal.

The obtaining of the decoded information of the second layer may include: calculating the bit metric of the second layer including code bit information of the second layer based on the second deinterleaved signal; calculating a branch metric of the second layer based on the bit metric of the second layer; and decoding an information bit of the second layer based on the branch metric of the second layer.

According to exemplary embodiments of the present invention, because an upper layer is decoded based on decoded information of a lower layer, interlayer interference can be reduced and the complexity of the receiver can be also reduced.

DETAILED DESCRIPTION OF THE EMBODIMENTS

Figure 1:
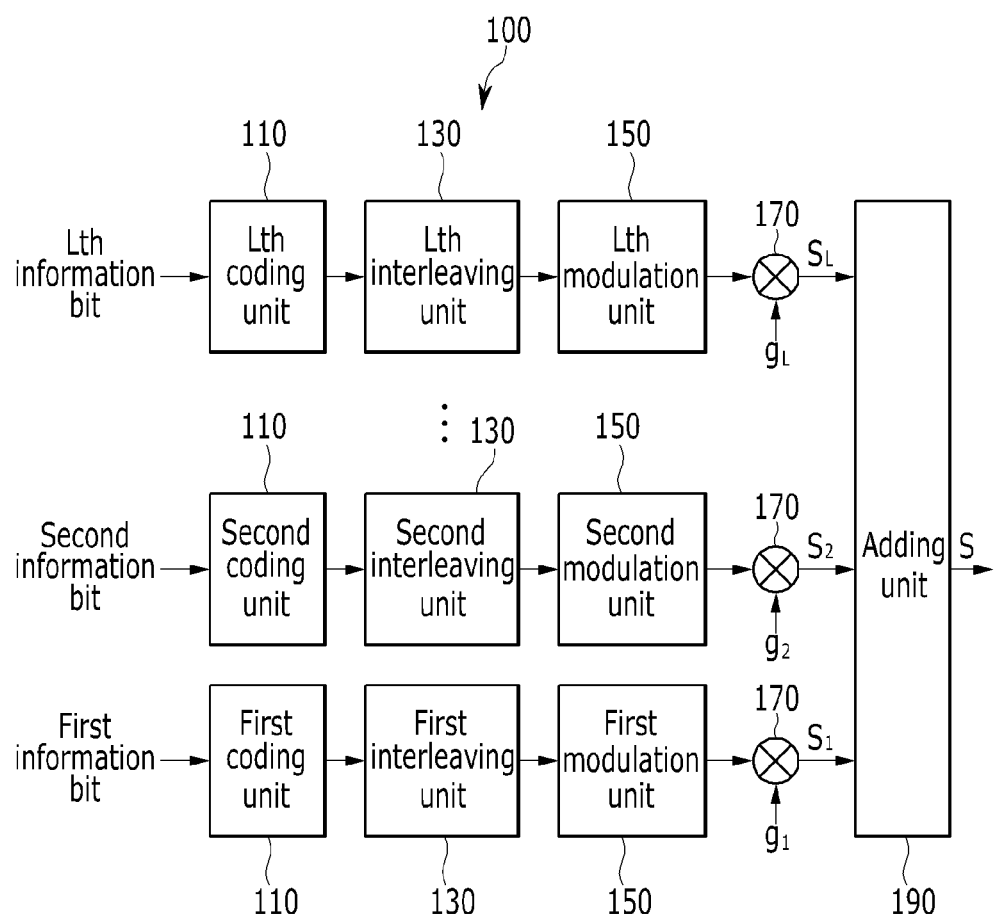
FIG. 1 is a view illustrating a transmitter according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

A receiver and a reception method according to exemplary embodiments of the present invention will now be described with reference to the accompanying drawings.

FIG. 1 is a view illustrating a transmitter according to an exemplary embodiment of the present invention.

With reference to FIG. 1, a transmitter 100 performs scalable video coding (SVC) on image information into L (L is a natural number) number of layers including a base layer and an enhancement layer and transmits the same. The transmitter 100 modulates information bits by layer to generate modulated symbols. The transmitter 110 includes a plurality of coding units 110, a plurality of interleaving units 130, a plurality of modulation units 150, a plurality of gain control units 170, and an adding unit 190 adding the modulated symbols to generate a transmission symbol. In this case, the plurality of coding units 110, the plurality of interleaving units 130, the plurality of modulation units 150, and the plurality of gain control units 170 correspond to a plurality of layers, respectively.

The plurality of coding units 110 code an information bit of a corresponding layer at a certain code rate to generate code bits.

The plurality of interleaving units 130 interleave the code bits from the coding units 110 to generate interleaved bit information. For example, the respective interleaving units 130 pair two code bits, which have been generated by the corresponding coding units 110, to bit-interleave the same. In this case, the respective interleaving units 130 may perform interleaving by classifying the bits into in-phase bits and quadrature bits.

The plurality of modulation units 150 modulate the interleaved bit information to generate modulated symbols of corresponding layers. In this case, the plurality of modulation units 150 may perform modulation according to a modulation scheme selected base on the input bits. For example, when the input bits are two bits, the plurality of modulation units 150 may perform modulation according to a QPSK (Quadrature Phase-Shift Keying) modulation to generate QPSK modulated symbols.

The plurality of gain control units 170 control gains ($g_1$, $g_2$-$g_L$) of the modulated symbols of the corresponding layers to generate gain-controlled modulated symbols ($s_1$, $s_2$-$s_L$).

The adding unit 190 adds all the modulated symbols ($s_1$, $s_2$-$s_L$) of the corresponding layers to generate a transmission symbol (s).

Figure 2:
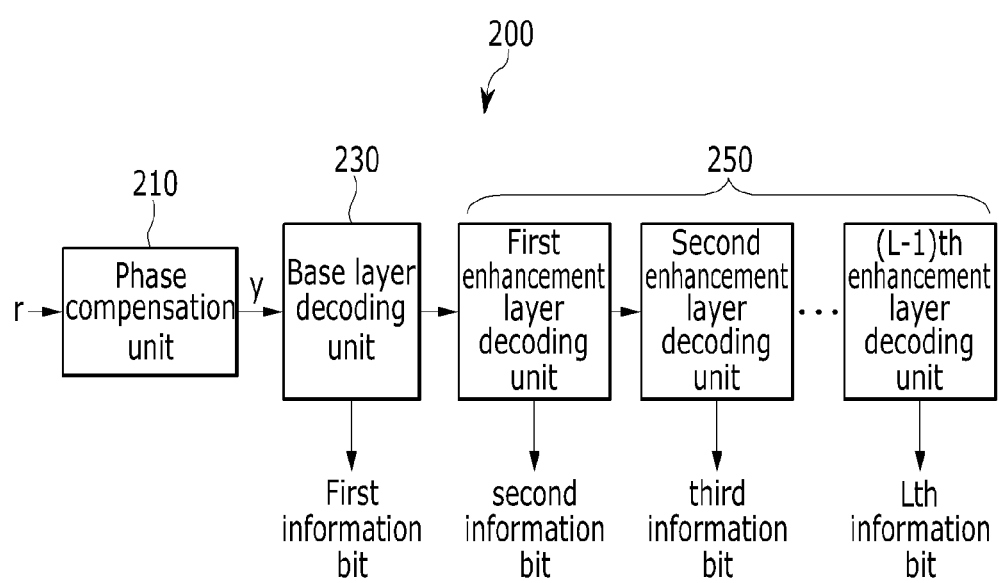
FIG. 2 is a view illustrating a receiver according to an exemplary embodiment of the present invention.

FIG. 2 is a view illustrating a receiver according to an exemplary embodiment of the present invention.

With reference to FIG. 2, a receiver 200 decodes a signal (r) received from the transmitter 100 to calculate an information bit corresponding to each of the layers. The receiver 200 includes a phase compensation unit 210 for compensating for the phase of the reception signal, a base layer decoding unit 230 for decoding the phase-compensated signal (y), and a plurality of enhancement layer decoding units 250 sequentially connected to the base layer decoding unit 230 according to the order of the layers.

The phase compensation unit 210 compensates for the phase of the reception signal [r(t)] and delivers the phase-compensated signal [y(t)] to the base layer decoding unit 230. The reception signal [r(t)] can be represented by Equation 1 shown below, and a channel information h(t) can be represented by Equation 2 shown below. In this case, 's' is symbols transmitted by the transmitter 100, and n(t) is a noise signal. The phase-compensated signal [y(t)] is calculated as represented by Equation 3.

$$r(t)=h(t)s+n(t) \quad \text{(Equation 1)}$$

$$h(t_{1,i})=\alpha(t)e^{-j}\phi(t) \quad \text{(Equation 2)}$$

$$y(t)\equiv e^{j\phi(t)}r(t) \quad \text{(Equation 3)}$$

The base layer decoding unit 230 decodes an information bit of a base layer among a plurality of layers. The base layer decoding unit 230 calculates a bit metric including code bit information of the bas layer based on the phase-compensated signal [y(t)], and decodes the information bit of the base layer.

The enhancement layer decoding unit 250 sequentially decodes an information bit of the enhancement layer, an upper layer of the base layer, based on the decoding results of the lower layer. The respective enhancement layer decoding units 250 receive a signal, from which information of the lower layer has been eliminated, from the lower layer, decode the information bit of the corresponding layers, and deliver a signal, from which the information of each of the corresponding layers has been eliminated based on the decoding results of the corresponding layers, to the upper layer. In this case, the signal without the information of the lower layer is a signal calculated based on the decoding results of the lower layer.

In this manner, when the respective layers are sequentially decoded based on the decoding results of the lower layers, because the upper layers can be decoded with the decoding information of the lower layers, delay may occur when all the layers are decoded. Thus, when the decoding scheme requires a repeated operation, the base layer decoding unit 230 and the enhancement layer decoding units 250 determine a signal to be delivered to an upper layer by using temporary decoded information obtained by repeating the operation by a certain number of times before the predetermined number of times are repeated.

Figure 3:
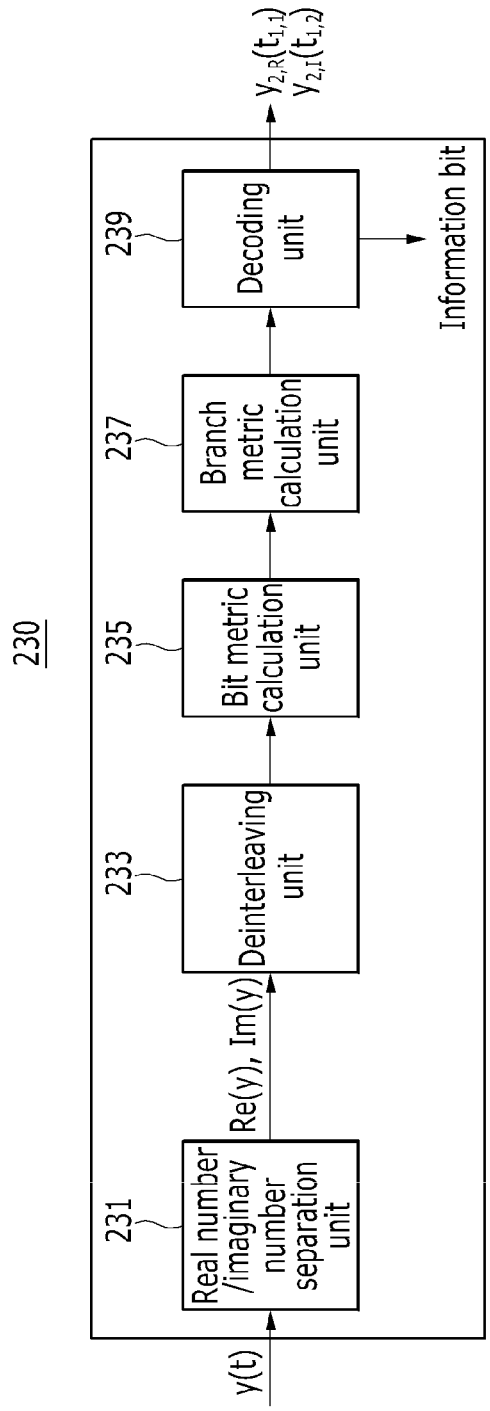
FIG. 3 is a schematic block diagram of a base layer decoding unit according to an exemplary embodiment of the present invention.

FIG. 3 is a schematic block diagram of a base layer decoding unit according to an exemplary embodiment of the present invention.

With reference to FIG. 3, the base layer decoding unit 230 decodes the information bit of the base layer, the lowermost layer, based on the signal [y(t)] received from the phase compensation unit 210. The base layer decoding unit 230 includes a real number/imaginary number separation unit 231 for separating an input signal into a real number part signal and an imaginary number part signal [Re(y), Im(y)], a deinterleaving unit 233 for deinterleaving the real number part signal and the imaginary number part signal [Re(y), Im(y)], a bit metric calculation unit 235 for calculating a bit metric based on the deinterleaved signal, a branch metric calculation unit 237 for calculating a branch metric of the base layer based on the bit metric of the base layer, and a decoding unit 239 for decoding the information bit of the base layer based on the branch metric of the base layer.

The real number/imaginary number separation unit 231 separates the signal [y(t)] into the real number part signal and the imaginary number part signal [Re(y), Im(y)]. When a real number signal [$s_{1,R}(t_{1,1})$], among the modulated symbols of the base layer, is generated at a point in time (t=$t_{1,1}$) and an imaginary number signal [$s_{1,I}(t_{1,2})$], among the modulated symbols of the base layer, is generated at a point in time (t=$t_{1,2}$) in the transmitter 100, the real number/imaginary number separation unit 231 separates the signal into the real number part signal [$y_R(t_{1,1})$] and the imaginary number part signal [$y_I(t_{1,2})$] at respective points in time (t=$t_{1,1}$, t=$t_{1,2}$). The real number part signal [$y_R(t_{1,1})$] of the signal [y(t)] whose phase was compensated at the point in time (t=$t_{1,1}$) can be represented by Equation 4 shown below, and the imaginary number part signal [$y_I(t_{1,2})$] of the signal [y(t)] whose phase was compensated at (t=$t_{1,2}$) can be represented by Equation 5 shown below:

$$y_R(t_{1,1}) \equiv \text{Re}[y(t_{1,1})] \quad \text{(Equation 4)}$$
$$= \alpha(t_{1,1})\left[\left(s_{1,R}(t_{1,1}) + \sum_{l=2}^{L} s_{l,R}(t_{1,1})\right)\right] + n_R(t_{1,1})$$

$$y_I(t_{1,2}) \equiv \text{Im}[y(t_{1,2})] \quad \text{(Equation 5)}$$
$$= \alpha(t_{1,2})\left[\left(s_{1,I}(t_{1,2}) + \sum_{l=2}^{L} s_{l,I}(t_{1,2})\right)\right] + n_I(t_{1,2})$$

In Equation 4, $s_{l,R}(t_{1,1})$ is a modulated symbol of the real number part of lth layer that passes through a channel at the point in time(t=$t_{1,1}$), and in Equation 5, $s_{l,I}(t_{1,2})$ is a modulated symbol of the imaginary number part of the lth layer that passes through the channel at the point in time(t=$t_{1,2}$). Here, $s_{l,R}(t_{1,1})$ is a signal obtained as the code bit [$c_{l,1}(\Delta_{l,1})$] generated at the point in time ($\Delta_{l,1}$) passes through the channel at the point in time (t=$t_{1,1}$) through the interleaving unit 130, the modulation unit 150, the gain control unit 170, and the adding unit 190. Also, 'n' is noise.

The deinterleaving unit 233 deinterleaves the real number part signal [$y_R(t_{1,1})$] and the imaginary number part signal [$y_I(t_{1,2})$], respectively. The deinterleaving unit 233 shifts the real number part signal [$y_R(t_{1,1})$] and the imaginary number part signal [$y_I(t_{1,2})$] to a point in time (t=$\Delta_1$) at which a code bit vector [$c_1(\Delta_1), c_1(\Delta_1)=(c_{1,1}(\Delta_1), c_{1,2}(\Delta_1))$] was generated, in order to obtain the code bit vector [$c_1(\Delta_1)$] of the base layer. Although the code bits included in the code bit vector [$c_1(\Delta_1)$] are generated at the same time point (t=$\Delta_1$), they pass through the channel at different points in time ($t_{1,1}$ and $t_{1,2}$). Accordingly, the deinterleaving unit 233 shifts the reception signal to the point in time (t=$\Delta_1$), at which the code bit was generated, to allow the bit metric calculation unit 235 to calculate a bit metric including the code bit information. The interleaving and deinterleaving of each layer based on the base layer can be represented by Equation 6 shown below:

$$\text{INT}_{L,i}(\Delta_{l,i}) = t_{l,i}, \text{DINT}_{L,i}(t_{l,i}) = \Delta_{l,i} \quad \text{(Equation 6)}$$

The bit metric calculation unit 235 calculates a bit metric including the code bit information based on the deinterleaved signal. The bit metric calculation unit 235 may calculate the code bit $[\hat{c}_{1,i}(\Delta_1)]$ at the point of time $(t=\Delta_1)$, and in this case, the bit metric calculation unit 235 may use a distance value (d) as shown in Equation 7 below to calculate the code bit $[\hat{c}_{1,i}(\Delta_1)]$. The distance between the code bits $[\hat{c}_{1,1}(\Delta_1), \hat{c}_{1,2}(\Delta_1)]$ of the base layer with respect to the reception signals $[y_R(t_{1,1}), y_1(t_{1,2})]$ are as shown in Equation 9 below:

$$M(\hat{c}_{1,i}(\Delta_i)) \equiv |d(\hat{c}_{1,i}(\Delta_1))| \quad \text{(Equation 7)}$$

$$\begin{aligned} d(\hat{c}_{1,1}(\Delta_1)) &\equiv d(\hat{s}_{1,R}(t_{1,1})) \\ &= y_R(t_{1,1}) - \alpha(t_{1,1})\hat{s}_{1,R}(t_{1,1}) \\ &= \alpha(t_{1,1})(s_{1,R}(t_{1,1}) - \hat{s}_{1,R}(t_{1,1})) + \\ &\quad \alpha(t_{1,1})s_{2,R}(t_{1,1}) + n_R(t_{1,1}) \end{aligned} \quad \text{(Equation 8)}$$

$$\begin{aligned} d(\hat{c}_{1,2}(\Delta_1)) &\equiv d(\hat{s}_{1,I}(t_{1,2})) \\ &= y_I(t_{1,2}) - \alpha(t_{1,2})\hat{s}_{1,I}(t_{1,2}) \\ &= \alpha(t_{1,2})(s_{1,I}(t_{1,2}) - \hat{s}_{1,I}(t_{1,2})) + \\ &\quad \alpha(t_{1,2})s_{2,I}(t_{1,2}) + n_I(t_{1,2}) \end{aligned} \quad \text{(Equation 9)}$$

The branch metric calculation unit 237 calculates a branch metric of the base layer based on the bit metric of the base layer. The branch metric with respect to the codeword $[\hat{c}_1(\Delta_1)]$ is obtained as the sum of the bit metrics of the respective code bits as shown in Equation 10 below. The codeword $[\hat{c}_1(\Delta_1)]$ includes information of the respective code bits $[\hat{c}_{1,1}(\Delta_1), \hat{c}_{1,2}(\Delta_1)]$. A branch metric having a code bit number n (n is a natural number) can be represented by Equation 11 shown below:

$$\begin{aligned} M(\hat{c}_1(\Delta_1)) &= M(\hat{c}_{1,1}(\Delta_1), \hat{c}_{1,2}(\Delta_1)) \\ &= M(\hat{c}_{1,1}(\Delta_1)) + M(\hat{c}_{1,2}(\Delta_1)) \end{aligned} \quad \text{(Equation 10)}$$

$$\begin{aligned} M(\hat{c}_1(\Delta_1)) &= M(\hat{c}_{1,1}(\Delta_1), \hat{c}_{1,2}(\Delta_1), \ldots, \hat{c}_{1,n}(\Delta_1)) \\ &= \sum_{i=1}^{n} M(\hat{c}_{1,i}(\Delta_1)) \end{aligned} \quad \text{(Equation 11)}$$

The decoding unit 239 receives the branch metric and decodes the information bit of the base layer. In this case, for example, the decoding unit 239 may use a Viterbi decoding or turbo decoding scheme. The decoding unit 239 obtains final decoding results by repeatedly performing decoding, and stores distance information with respect to the code bit at each stage. For example, in case of two code bits, the decoding unit 239 stores $d(\hat{c}_{1,1}=0)=d(\hat{s}_{1,R}=+g_1)$, $d(\hat{c}_{1,1}=1)=d(\hat{s}_{1,R}=-g_1)$, $d(\hat{c}_{1,2}=0)=d=(\hat{s}_{1,I}=+g_1)$ and $d(\hat{c}_{1,2}=1)=d(\hat{s}_{1,I}=-g_1)$. When the decoding operation is finished, the decoding unit 239 delivers signals, which are obtained by eliminating the information of the base layer from the reception signal, namely, $[y_{2,R}(t_{1,1}), y_{2,I}(t_{1,2})]$, to an upper layer of the base layer. When Equation 8 is organized based on the decoding results $[\hat{c}_{1,1}(\Delta_1)=c_{1,1}(\Delta_1), \hat{c}_{1,2}(\Delta_1)=c_{1,2}(\Delta_1)]$ of the decoding unit 239, the distance of the code bit $[\hat{c}_{1,1}(\Delta_1)]$ can be represented by Equation 12 as shown below, and likewise, when Equation 9 is organized, the distance of the code bit $[\hat{c}_{1,2}(\Delta_1)]$ can be represented by Equation 13 as shown below.

$$\begin{aligned} d^*(c_{1,1}(\Delta_1)) &\equiv d(\hat{c}_{1,1}(\Delta_1)) \\ &= c_{1,1}(\Delta_1)) \\ &= d(\hat{s}_{1,R})(t_{1,1}) \\ &= s_{1,R}(t_{1,1})) \\ &\equiv d^*(s_{1,R}(t_{1,1})) \\ &= y_R(t_{1,1}) - \alpha(t_{1,1})s_{1,R}(t_{1,1}) \\ &= \alpha(t_{1,1})s_{2,R}(t_{1,1}) + n_R(t_{1,1}) \end{aligned} \quad \text{(Equation 12)}$$

$$\begin{aligned} d^*(\hat{c}_{1,2}(\Delta_1)) &\equiv d(\hat{c}_{1,2}(\Delta_1) \\ &= c_{1,2}(\Delta_1)) \\ &= d(\hat{s}_{1,I}(t_{1,2}) \\ &= s_{1,I}(t_{1,2})) \\ &\equiv d^*(s_{1,I}(t_{1,2})) \\ &= y_I(t_{1,2}) - \alpha(t_{1,2})s_{1,I}(t_{1,2}) \\ &= \alpha(t_{1,2})s_{2,I}(t_{1,2}) + n_I(t_{1,2}) \end{aligned} \quad \text{(Equation 13)}$$

As a result, Equation 12 and Equation 13 are signals obtained by eliminating the information $[s_{1,R}(t_{1,1}), s_{1,I}(t_{1,2})]$ of the base layer from the reception signals $[y_R(t_{1,1}), y_1(t_{1,2})]$ based on the decoding results of the base layer. Accordingly, the signals $[y_{2,R}(t_{1,1}), y_{2,I}(t_{1,2})]$ delivered by the decoding unit 239 can be represented by Equation 14 and Equation 15 as shown below:

$$y_{2,R}(t_{1,1}) = d^*(s_{1,R}(t_{1,1})) = \alpha(t_{1,1})s_{2,R}(t_{1,1}) + n_R(t_{1,1}) \quad \text{(Equation 14)}$$

$$y_{2,I}(t_{1,2}) = d^*(s_{1,I}(t_{1,2})) = \alpha(t_{1,2})s_{2,I}(t_{1,2}) + n_I(t_{1,2}) \quad \text{(Equation 15)}$$

In this case, in order to reduce delay, the decoding unit 239 may determine the signals $[y_{2,R}(t_{1,1}), y_{2,I}(t_{1,2})]$ including upper layer information by using temporary decoded information obtained before completing the decoding operation.

Figure 4:
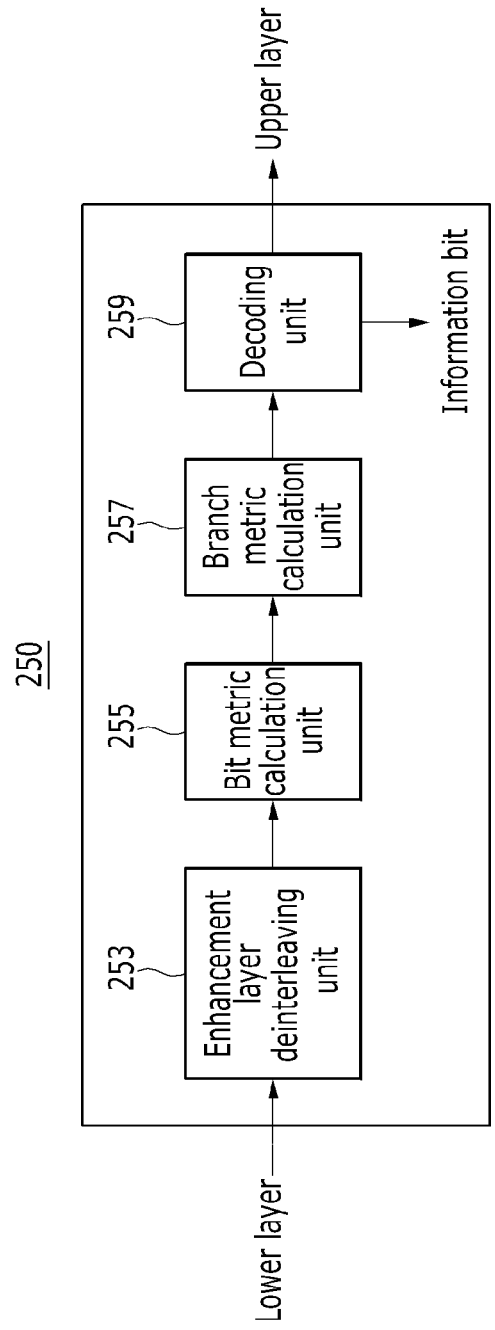
FIG. 4 is a schematic block diagram of an enhancement layer decoding unit according to an exemplary embodiment of the present invention.

FIG. 4 is a schematic block diagram of an enhancement layer decoding unit according to an exemplary embodiment of the present invention.

With reference to FIG. 4, the enhancement layer decoding units 250 receive the signal without the information of the lower layer and decode the information bit of the corresponding layer. Each of the enhancement layer decoding units 250 includes an enhancement layer deinterleaving unit 253 for shifting the signal delivered from the lower layer to a coding point in time of a corresponding layer, a bit metric calculation unit 255 for calculating a bit metric based on the deinterleaved signal, a branch metric calculation unit 257 for calculating a branch metric based on the bit metric, and a decoding unit 259 for decoding an information bit of the corresponding layer. The enhancement layer decoding unit 250 for decoding a second layer following the base layer will be described as an example.

The enhancement layer deinterleaving unit 253 deinterleaves the input signals $[y_{2,R}(t_{1,1}), y_{2,I}(t_{1,2})]$ delivered from the base layer. The signals received from the base layer are the signals from which the information of the base layer has been eliminated, as shown in Equation 14 and Equation 15. At this time, the enhancement layer deinterleaving unit 253 shifts the input signals to a coding point in time of the second layer in order to decode them at a point in time at which the code bit of the second layer has been generated. In order to obtain the code bit generated at the point in time $(t=\Delta_{21})$, first, the enhancement layer deinterleaving unit 253 interleaves the input signal $[y_{2,R}(t_{1,1})]$ and shifts to a point in time $(t=t_{1,1})$ before the deinterleaving was performed in the base layer decoding unit 230, and performs deinterleaving to shift from the shifted point $(t=t_{1,1})$ to a coding point in time $(t=\Delta_{2,1})$ of the second layer. The interleaving and deinterleaving performed by the enhancement layer deinterleaving unit 253 can be represented by Equation 16 shown below:

$$INT_{1,R} * DINT_{2,R}(\Delta_1) = \Delta_{2,1} \quad \text{(Equation 16)}$$

Similarly, in order to obtain another code bit $[c_{2,2}(\Delta_{22})]$ of the second layer, the enhancement layer deinterleaving unit 253 interleaves the input signal $[y_{2,I}(t_{1,2})]$ and shifts to a point in time ($t=t_{1,2}$) before the deinterleaving was performed in the base layer decoding unit 230, and performs deinterleaving to shift from the shifted point ($t=t_{1,2}$) to a coding point in time ($t=\Delta_{2,2}$) of the second layer.

Thereafter, the bit metric calculation unit 255, the branch metric calculation unit 257, and the decoding unit 259 perform operations in the same manner as those of the bit metric calculation unit 235, the branch metric calculation unit 237, and the decoding unit 239 of the base layer as described above. Namely, when the bit metric calculation unit 255 calculates a bit metric of the second layer by using the output signal from the enhancement layer deinterleaving unit 253 and the branch metric calculation unit 257 calculates a branch metric, the decoding unit 259 decodes an information bit of the second layer by using the branch metric. Thereafter, as described above with the decoding unit 239 of the base layer, when the decoding operation is finished, the decoding unit 259 then delivers a signal obtained by removing information of the second layer based on the decoding results to a third layer.

Figure 5:
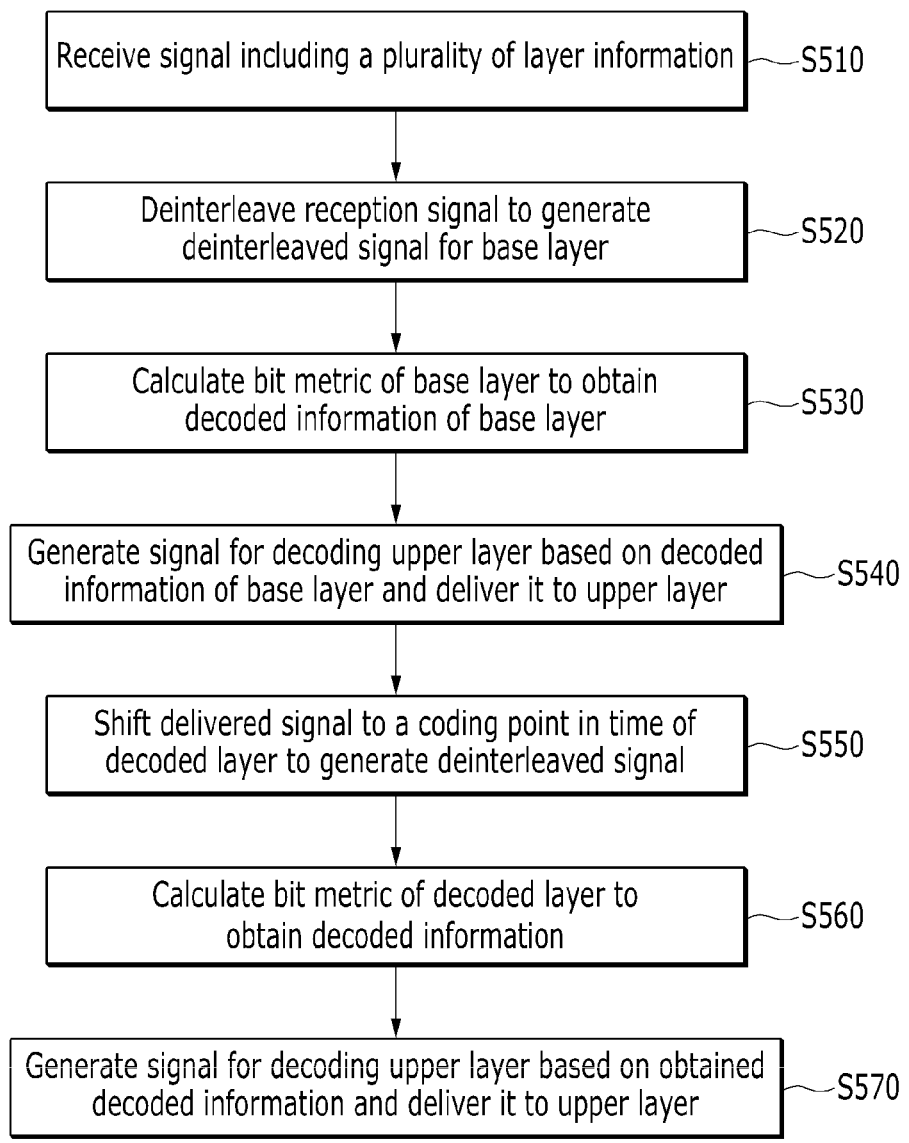
FIG. 5 is a flow chart illustrating the process of a reception method of a receiver according to an exemplary embodiment of the present invention.

FIG. 5 is a flow chart illustrating the process of a reception method of a receiver according to an exemplary embodiment of the present invention.

With reference to FIG. 5, the receiver 200 receives a signal including a plurality of layer information (step S510).

The receiver 200 deinterleaves the reception signal to generate a deinterleaved signal for a base layer (step S520). Although the respective code bits of the base layer are generated at the same point in time ($t=\Delta_1$), they may pass through a channel at different points in time, so the receiver 200 shifts the reception signal to the same point in time ($t=\Delta_1$).

The receiver 200 calculates a bit metric of the base layer based on the deinterleaved signal for the base layer to obtain decoded information of the base layer (step S530). At this time, the receiver 200 calculates the bit metric and a branch metric to decode them.

The receiver 200 delivers a signal for decoding an upper layer generated based on the decoded information of the base layer to an upper layer (step S540). The signal for decoding the upper layer is included in upper layer information, and obtained by eliminating the information of the base layer from the reception signal. In this case, the receiver 200 may generate a signal including the upper layer information based on temporary decoded information obtained before the decoding operation is finished.

In order to shift the signal delivered from the base layer to a coding point in time of the corresponding layer, namely, the second layer, an upper layer of the base layer, the receiver 200 performs deinterleaving to generate a deinterleaved signal (step S550).

Thereafter, the receiver 200 calculates a bit metric based on the deinterleaved signal to obtain decoded information of the second layer (step S560). In this case, the receiver 200 calculates the bit metric and a branch metric required for the decoding, and performs decoding.

The receiver 200 generates a signal for decoding a third layer based on the decoded information of the second layer, and delivers the signal to an upper layer (step S570). In this manner the receiver sequentially delivers signals generated based on the decoded information of lower layers to upper layers to obtain decoded information of the plurality of layers.

As described above, according to the exemplary embodiments of the present invention, because the receiver 200 decodes the upper layers based on the decoded information of the lowers layer, interlayer interference can be reduced and the complexity can be also reduced in spite of the use of coded information.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A receiver for receiving a layer-modulated signal, the receiver comprising:
    a base layer decoding unit configured to calculate a bit metric including code bit information of a base layer based on a reception signal and decode an information bit of the base layer; and
    at least one enhancement layer decoding unit configured to decode an information bit of an upper layer based on decoding results of a lower layer,
    wherein the base layer decoding unit and the at least one enhancement layer decoding unit are sequentially connected according to an order of corresponding layers, and wherein the base layer decoding unit comprises:
    a base layer deinterleaving unit configured to deinterleave the reception signal to generate a deinterleaved signal;
    a base layer bit metric calculation unit configured to calculate the bit metric of the base layer including the code bit information of the base layer based on the deinterleaved signal;
    a base layer branch metric calculation unit configured to calculate a branch metric of the base layer based on the bit metric of the base layer; and
    a base layer decoding unit configured to decode the information bit of the base layer based on the branch metric of the base layer.

2. The receiver of claim 1, wherein the at least one enhancement layer decoding unit receives a signal obtained by eliminating information of the lower layer based on decoding results of the base layer and decodes the information bit of the upper layer.

3. The receiver of claim 2, wherein the at least one enhancement layer decoding unit shifts the signal obtained by eliminating information of the lower layer to a coding point in time of the upper layer to decode the information bit of the upper layer.

4. The receiver of claim 3, wherein the at least one enhancement layer decoding unit shifts the signal obtained by eliminating information of the lower layer to a point in time at which the lower layer was deinterleaved by interleaving, and shifts the interleaved signal to the decoding point in time of the upper layer by deinterleaving.

5. The receiver of claim 4, wherein the at least one enhancement layer decoding unit comprises:
    an enhancement layer deinterleaving unit configured to shift the signal obtained by eliminating information of the lower layer to the coding point in time of the upper layer;
    an enhancement layer bit metric calculation unit configured to calculate the bit metric of the upper layer including the code bit information based on an output signal from the enhancement layer deinterleaving unit;

an enhancement layer branch metric calculation unit configured to calculate a branch metric of the upper layer based on the bit metric of the upper layer; and an enhancement layer decoding unit configured to decode the information bit of the upper layer based on the branch metric of the upper layer.

6. The receiver of claim 1, wherein the at least one enhancement layer decoding unit decodes the information bit of the upper layer based on temporary decoded information determined before the decoding of the lower layer is finished.

7. A receiver for receiving a plurality of layer-modulated layer information, the receiver comprising:

a reception unit configured to receive a first signal including the plurality of layer information;

a first deinterleaving unit configured to deinterleave the first signal;

a first decoding unit configured to calculate a bit metric of a first layer among the plurality of layer information based on an output signal from the first deinterleaving unit to decode an information bit of the first layer;

a second deinterleaving unit configured to shift a second signal delivered from the first decoding unit to a decoding point in time of a second layer as an upper layer of the first layer; and a second decoding unit configured to calculate a bit metric of the second layer based on an output signal from the second deinterleaving unit to decode an information bit of the second layer, and deliver a third signal obtained by eliminating information of the second layer from the second signal to a third layer as an upper layer of the second layer, wherein the first decoding unit comprises:

a first bit metric calculation unit configured to calculate the bit metric of the first layer including code bit information of the first layer based on the output signal from the first deinterleaving unit;

a first branch metric calculation unit configured to calculate the branch metric of the first layer based on the bit metric of the first layer; and a first decoding unit configured to decode the information bit of the first layer based on the branch metric of the first layer and generate the second signal including the upper layer information of the first layer based on the decoded information bit.

8. The receiver of claim 7, wherein the second deinterleaving unit shifts the second signal obtained by removing the information of the first layer from the first signal by using the decoded information bit of the first decoding unit to a decoding point in time of the second layer.

9. The receiver of claim 7, wherein the second deinterleaving unit performs interleaving to shift the second signal to a point in time before the first layer was deinterleaved, and performs deinterleaving to shift from the shifted point in time to the coding point in time of the second layer.

10. The receiver of claim 7, wherein the second decoding unit comprises:

a second bit metric calculation unit configured to calculate a bit metric of the second layer including code bit information of the second layer based on an output signal from the second deinterleaving unit;

a second branch metric calculation unit configured to calculate a branch metric of the second layer based on the bit metric of the second layer; and a second decoding unit configured to decode the information bit of the second layer based on the branch metric of the second layer and generate the third signal including information of an upper layer of the second layer based on the decoded information bit.

11. The receiver of claim 7, wherein the first decoding unit or the second decoding unit generates the second signal or the third signal based on temporary decoded information determined before decoding is finished.

12. A reception method for receiving a plurality of layer-modulated layer information by a receiver, the method comprising:

receiving a first signal including the plurality of layer information; deinterleaving the first signal to generate a first deinterleaved signal;

calculating a bit metric of a first layer, among the plurality of layer information, based on the first deinterleaved signal to obtain decoded information of the first layer;

generating a second signal including information of an upper layer of the first layer based on the decoded information of the first layer;

shifting the second signal to a coding point in time of the second layer as the upper layer of the first layer to generate a second deinterleaved signal;

calculating a bit metric of the second layer based on the second deinterleaved signal to obtain decoded information of the second layer; and generating a third signal including information of an upper layer of the second layer based on the decoded information of the second layer, wherein the obtaining of the decoded information of the first layer comprises:

calculating the bit metric of the first layer including code bit information of the first layer based on the first deinterleaved signal;

calculating a branch metric of the first layer based on the bit metric of the first layer; and decoding an information bit of the first layer based on the branch metric of the first layer.

13. The method of claim 12, wherein, in generating the second signal, the second signal is generated by eliminating the decoded information of the first layer from the first signal.

14. The method of claim 12, wherein, in generating the second signal, the second signal is generated based on temporary decoded information determined before the decoding of the first layer is finished.

15. The method of claim 12, wherein, in generating the second deinterleaved signal, interleaving is performed to shift the second signal to a point in time before the first layer was deinterleaved, and deinterleaving is performed to shift from the shifted point to the decoding point in time of the second layer to generate the second deinterleaved signal.

16. The method of claim 12, wherein the obtaining of the decoded information of the second layer comprises:

calculating the bit metric of the second layer including code bit information of the second layer based on the second deinterleaved signal;

calculating a branch metric of the second layer based on the bit metric of the second layer; and decoding an information bit of the second layer based on the branch metric of the second layer.

* * * * *